United States Patent
Xie

(12) 
(10) Patent No.: US 6,708,299 B1
(45) Date of Patent: Mar. 16, 2004

(54) BCA DATA REPLAY

(75) Inventor: Jianlei Xie, Carmel, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/444,857

(22) Filed: Nov. 22, 1999

(51) Int. Cl.$^7$ ................ G11C 29/00; H03M 13/05; H03M 13/47; H04L 1/08
(52) U.S. Cl. ................ 714/718; 714/723; 714/784; 714/799; 714/822
(58) Field of Search ............... 369/16, 53.11–53.17; 714/710, 718, 723, 799, 819, 822

(56) References Cited

U.S. PATENT DOCUMENTS

| | | | |
|---|---|---|---|
| 5,914,928 A | * | 6/1999 | Takahashi .................. 369/58 |
| 6,188,538 B1 | * | 2/2001 | Mills et al. ............... 360/77.04 |
| 6,301,208 B1 | | 10/2001 | Sugaya et al. |
| 6,332,204 B1 | * | 12/2001 | Russell ....................... 714/710 |
| 6,414,920 B1 | * | 7/2002 | Lee ........................... 369/47.31 |

FOREIGN PATENT DOCUMENTS

| | | | | |
|---|---|---|---|---|
| EP | 0741382 A1 | | 11/1996 | ........... G11B/7/00 |
| EP | 0926664 A2 | | 6/1999 | ........... G11B/7/007 |
| EP | 1102263 A1 | * | 5/2001 | ........... G11B/20/10 |
| GB | 2332977 A | | 12/1997 | ........... G11B/19/12 |
| JP | 10-198965 | | 7/1998 | ........... G11B/7/00 |
| JP | 10-228646 | | 8/1998 | ........... G11B/7/00 |
| JP | 2000132903 | | 5/2000 | ........... G11B/19/12 |
| JP | 2000132903 A | * | 5/2000 | ........... G11B/19/12 |
| JP | 2001297443 A | * | 10/2001 | ........... G11B/7/005 |

OTHER PUBLICATIONS

"Australian Written Opinion" enclosed.

* cited by examiner

*Primary Examiner*—R. Stephen Dildine
(74) *Attorney, Agent, or Firm*—Joseph S. Tripoli; Harvey D. Fried; Francis A. Davenport

(57) ABSTRACT

A first method for acquiring data from a recording on a disk medium, comprises the steps of, successively reading bits defining a data set from different parts of the disk, continuously error correcting the bits to validate at least a part of the data set read from the disk, and, terminating reading upon successful validation of the data set by the error correcting step. A second method for acquiring data from a recording on a disk medium, comprises the steps of reading a data set beginning from a first position on the data recording, reading the data set from a second position radially spaced in a first direction from the first position absent acquisition of an error free data set from the first position; and, reading the data set from a third position radially spaced in an opposite direction beyond the first position absent acquisition of an error free data set from the second position.

14 Claims, 3 Drawing Sheets

- LEAD OUT AREA
- DATA AREA
- LEAD IN AREA
- CLAMP AREA
- SPINDLE HOLE
- BURST CUTTING AREA Z
- AREA SHOWN IN FIG. 1B

BCA DATA REPLAY

This invention relates to the reproduction of a digitally encoded signal from a disk medium and in particular to the recovery of data added subsequent to pressing.

BACKGROUND OF THE INVENTION.

The introduction of optically readable disks recorded with data or digitally compressed audio and video signals, offers the consumer access to very significantly sized data records or sound and picture quality virtually indistinguishable from the original material. However, the provision of such features and potential for near identical replication exemplify a need to protect or control dissemination of the material contained within the disk. In a digital versatile disk (DVD) specification titled DVD Specification for Read-Only Disc/part 1, Physical Specifications Version 1, appendix K, a method is detailed which facilitates the individual identification of disks following mass production by use of a burst cutting area code. Disks may be identified by a series of radially positioned cuts or surface reflectance deformations which occupy a specified circumferential band adjacent to a specified disk clamping area. These radial stripes are positioned to over-write and partially obliterate a disk area specified for lead-in data. The BCA data can represent from 10 to 188 bytes of data which is modulated by phase encoding prior to over-writing. The BCA data comprises a data field, error detection and correction codes and pre and post amble fields.

When disk replay is initiated the lead-in data area is read and the lead-in data examined to determine the status of bit 16, which if set to 1 indicates the presence of encoded burst cutting area data. If BCA data is indicated, the burst cutting area is read and the data recovered. Current BCA data acquisition methods employ a serial process of data acquisition and error correction where erroneous data initiates a request for additional BCA data from the disk. This request usually jumps the transducer to the beginning of the lead in area then back to the nominal center of the burst cutting area in for a second attempt at BCA data recovery. Failure to recover this disk specific data may render further reproduction of the disk impossible. Such BCA data recovery failures may be attributed to poor data signal recovery possibly resulting from dirty BCA data or "cutting" deficiencies, splattered disk material, swarf or inconsistencies of the lowered reflectance stripes representing the BCA data

SUMMARY OF THE INVENTION

An inventive method allows a disk replay system to acquire, detect and error-correct burst cutting area data more efficiently and effectively. A first method for acquiring data from a recording on a disk medium, comprises the steps of, successively reading bits defining a data set from different parts of the disk, continuously error correcting the bits to validate at least a part of the data set read from the disk, and, terminating reading upon successful validation of the data set by the error correcting step. A second method for acquiring data from a recording on a disk medium, comprises the steps of reading a data set beginning from a first position on the data recording, reading the data set from a second position radially spaced in a first direction from the first position absent acquisition of an error free data set from the first position; and, reading the data set from a third position radially spaced in an opposite direction beyond the first position absent acquisition of an error free data set from the second position.

DETAILED DESCRIPTION

Figure 1A:
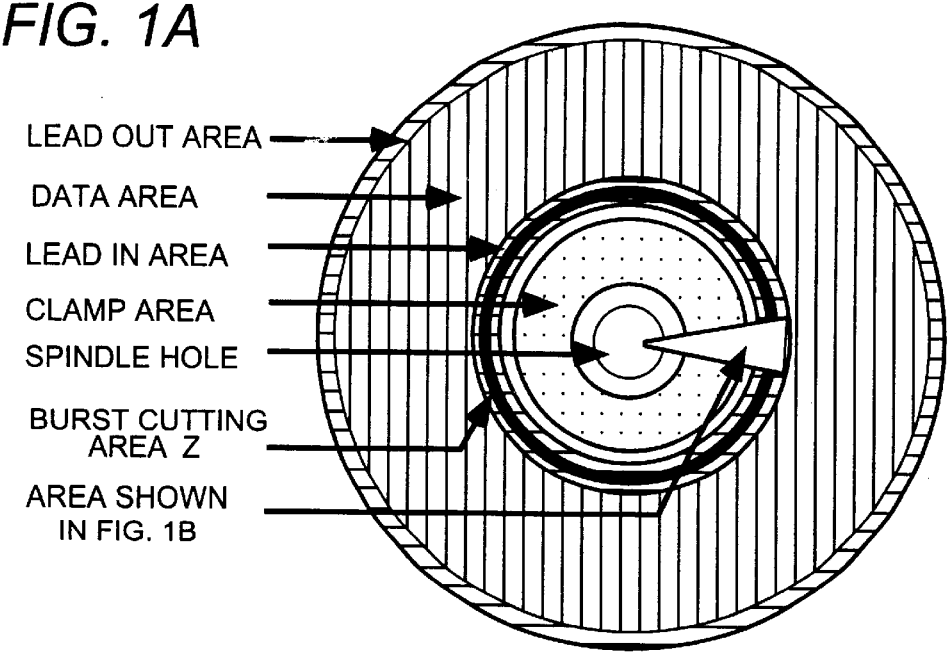
FIG. 1A illustrates an exemplary digital versatile disk or DVD with depictions of the positions and distribution of signals written thereon.

A digital versatile disk or DVD is illustrated in FIG. 1A which shows the approximate location of various features and data types recorded thereon. The disk has a diameter of 120 millimeters with a center spindle hole of 15 millimeters. Adjacent to the spindle hole is a disk clamping area, depicted with dots, having minimum and maximum diameters of 22 and 33 millimeters respectively. A guard band is provided between the clamping area and a lead-in data area, depicted with horizontal lines in FIG. 1A, (multiple dots in FIG. 1B) and occupying an area between diameters of 45.2 and 48 millimeters. The data or "program" area is shown with vertical stripes and is located between diameters of 48 and 116 millimeters, with a lead-out diameter of at least 1 millimeter. To facilitate the individualization of disks following mass production an area is provided where disk specific data, for example serial number or identification data can be added. This optional marking area, is known as the burst cutting area or BCA, and is located between diameters of 44.6 to 47 millimeters respectively, (shown in FIG. 1B between radii R1 and R3 respectively). Thus BCA data records are written within the lead-in data area of the disk.

Figure 1B:
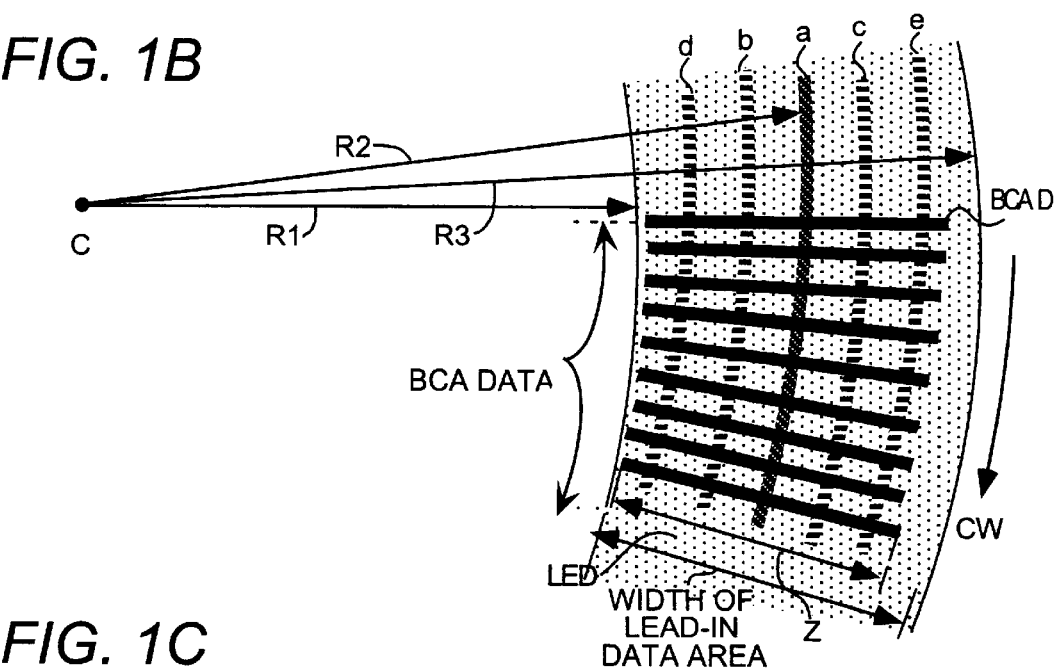
FIG. 1B depicts in detail, part of the white sector shown in FIG. 1A.

Burst cutting area data is phase encoded and written by means of radial cuts or changes to the surface reflectance of the disk and is applied over the existing lead-in data, as depicted by black bars BCAD in FIG. 1B. In simple terms, BCA data is represented by the spacing between the radial cuts BCAD. Changes to the surface reflectance in the region of BCA data writing is depicted in FIG. 1D where BCA data is represented by the low signal areas BCAD and unmodified reflectance area indicated by higher amplitude signal TRKa, for example caused by the reflectance of the track between the BCA cuts. Disk lead-in data comprises an initial area with sector addresses from 000000h to 02EEEEh where a data value of 00h is written. Between sector addresses 02F000h to 02F020h a reference code is written which is followed by 30 ECC blocks containing a data value 00h. Starting at sector address 02F200h control data is written occupying one ECC block (or 16 sectors) which is repeated 192 times. At byte position 16 of this control data is a one byte BCA descriptor where a value of all is indicates BCA data presence and a value with 0s indicating a BCA data absence. If the nominal lead-in area dimensional specifications are considered, with a track pitch of $0.74\,\mu$ meters, the lead-in data area depicted as LED may contain approximately 1890 tracks. Similarly, if the nominal burst cutting area dimensions are considered, BCA data may overwrite, or stripe, approximately 1620 tracks of lead-in data. Expressed in a different way, there are approximately 1620 transducer locations at which the BCA data record can be read. Thus lead-in data which is not overwritten is present in approximately 270 tracks distributed in areas before and after the BCA data record.

Figure 1C:
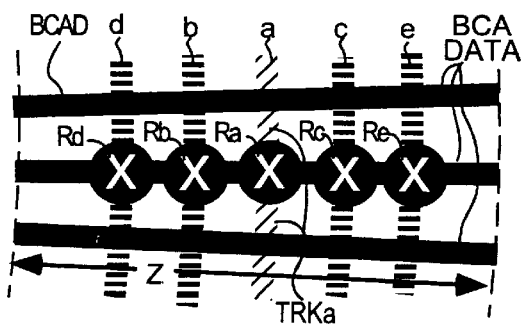
FIG. 1C is a magnified depiction of BCA data records shown in FIGURE 1B.
Figure 1D:
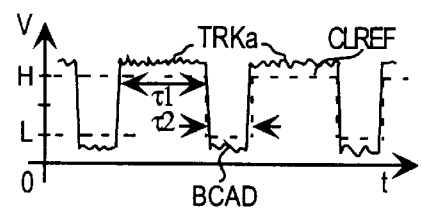
FIG. 1D illustrates a reflected signal and a processed BCA data signal.

FIG. 1C depicts a magnified view of BCA data records BCAD which are written radially across exemplary lead-in data tracks a, b, c, d and e. However, as mentioned previously, the nominal specified dimensions permit approximately 1620 tracks to be overwritten in burst cutting area Z. The transducer is positioned to follow each track, for example track a, or more correctly to remain focused on the single spiral track starting at exemplary radius Ra for acquisition, during several disk revolutions, of multiple data sets from track "a".

Unlike current methods which repeatedly attempt to recover data from a single location, this advantageous method reads BCA data at a plurality different disk radii to advantageously allow data acquisition to be performed independently of the error correction processing. In addition the acquisition of multiple BCA data sets at a plurality of disk radii enhances the likelihood of acquiring data capable of successful error correction processing. Thus a series of sets of BCA data are acquired and temporarily stored for possible subsequent coupling for error correction if required. The advantageous plurality of different radial reading positions for the transducer are depicted by black Xed circles Ra, Rb, Rc, Rd and Re. The transducer radial positioning follows a first exemplary sequence which is initiated at read radius Ra which represents the nominal center of the BCA data record. Following acquisition of data from track "a" the transducer is moved, for example by means of the deflection coil 15T to read radius Rb which, for example, is at a radius less than that of radius Ra. The selection of transducer position changes or jumps to be radial distances of approximately 100 tracks enables the BCA data search to be performed by use of use of the tracking deflection coil which permitting rapid repositioning. In the first exemplary sequence, the pattern of radial locations Ra, Rb, Rc . . . Rn, of the transducer is predetermined and derived from a memory, which can be located in either the front end or back end processing. In this first exemplary sequence the transducer position alternates about the nominal center radius Ra of the data record, with the second read position Rb being nominally 100 tracks less than the nominal center position Ra. The third read position Rc is positioned nominally 200 tracks greater than position Rb with the fourth location Rd being nominally 300 tracks less than position Rc. Thus it can be seen that the transducer is repeatedly repositioned to search the radial record both outwardly, toward the outer edge and inwardly toward the spindle hole C. In this way poorly recorded or optically occluded data records are expeditiously explored to maximize the likelihood of acquiring data capable of error correction.

Advantageously the second transducer position Rb is chosen to be closer to the disk spindle hole C, of FIG. 1B, order that gross miscentering of radius Ra within the BCA record will be quickly identified and the transducer search algorithm adaptively modified to prevent further excursions into areas in which lack BCA data recording. Advantageously the reflected signal from the disk surface is processed, as will be explained with reference to FIG. 2, to generate a signal which indicates a presence or absence of a BCA data recording reflection. Where an absence of a specific characteristic of the reflected light signal is indicative of transducer positioning over a disk area which does not contain a BCA data record. Advantageously, the absence of BCA data signal is used to adapt, modify or select the transducer search algorithm. For example, the progressively increasing, peak to peak search is changed to a unidirectional stepped search sequence.

In a second exemplary sequence, the transducer radial position is progressively incremented from a nominal BCA data record start position to acquire a plurality of data. In a third exemplary sequence, the transducer radial positioning is progressively decremented from the nominal end position of BCA data record.

The advantageous BCA data record search algorithms not only aquires multiple sets of data for error correction, but in addition facilitates a parallel operation which allows separation between BCA data acquisition and BCA data error correction.

Figure 2:
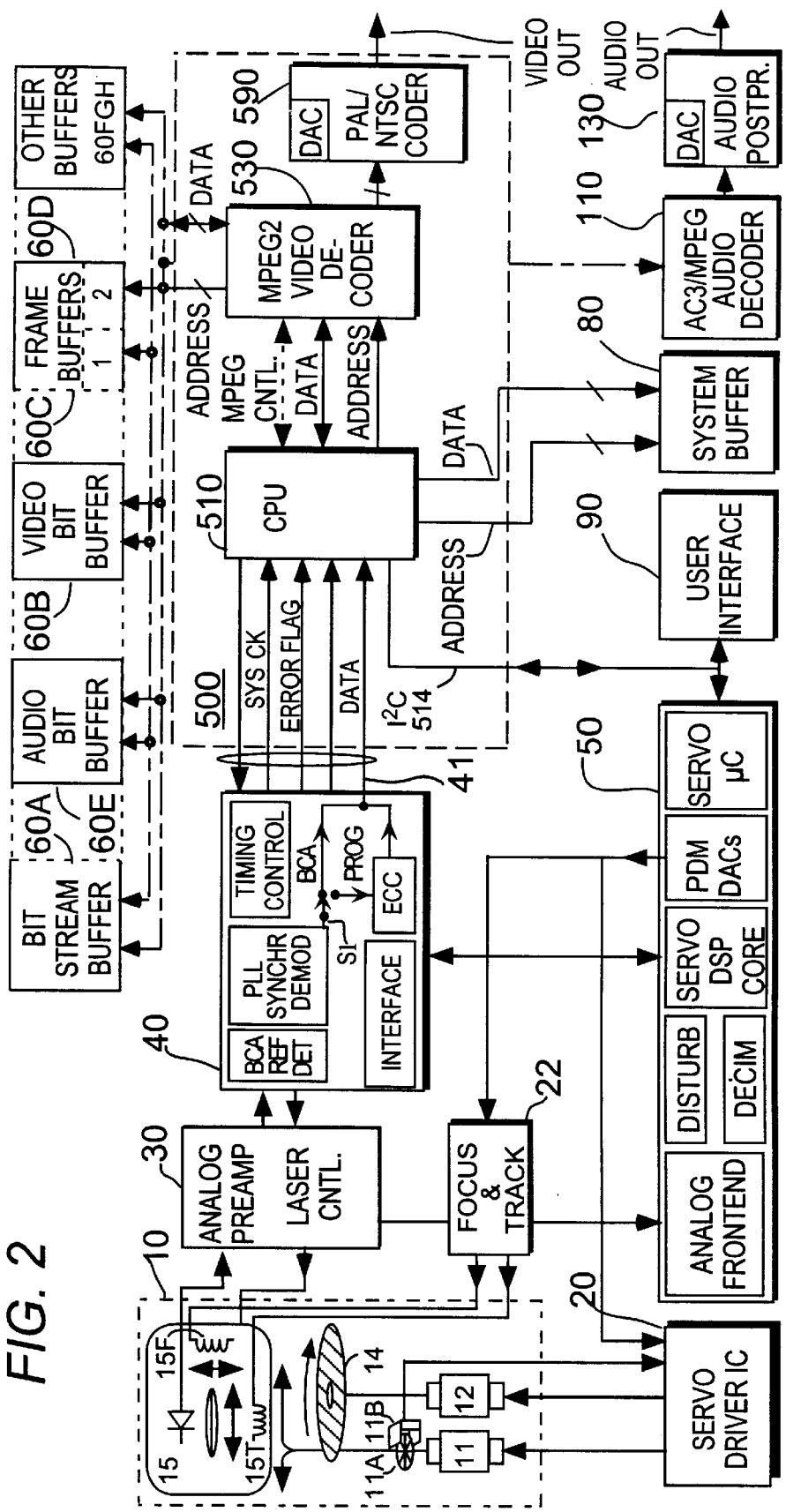
FIG. 2 is a block diagram of an exemplary digital disk player including inventive arrangements.

FIG. 2 is an exemplary block diagram of a digital video disk player. Block 10 depicts a deck which may accept a digitally recorded disk 14 for rotation by a motor 12. A digital signal is recorded on disk 14 as a spiral track containing pits with lengths determined by an 8/16 modulation coding of a data signal stream. The modulation on disk 14 is read by a movable pick up sled 15 which gathers reflected illumination from a laser (not shown). The reflected laser light is focused by a lens system on to a photo detector or opto pick-up device, depicted as a diode. The pick up sled 15 is positional servo controlled by motor 11 to locate and follow specific tracks on the recorded disk. Motor 11 includes a tachometer 11A/B, for example employing an optical or magnetic sensing device 11B which generates a series of pulses per motor revolution. Thus pick-up sled 15 may be precisely positioned to access different parts of the recording by, for example, counting tachometer pulses. Alternatively sled 15 may be positioned with reference to a lookup table containing disk sector addresses and corresponding tachometer pulse counts or sled motor activation times at specific motor currents. In addition, the lens system is positionally controlled by an exemplary magnetic positioner 15T to provide a vernier or precision track following control capability. The lens system is focus controlled by an exemplary magnetic positioner 15F.

Servo controlled motors 11 and 12 are driven by integrated circuit drive amplifier 20. The exemplary opto pick-up device of sled 15 is coupled to an opto preamplifier, block 30, which includes drive circuitry for the laser illuminator and a preamplifier which provides amplification and equalization for the reflected signal output from the opto pick-up. The amplified and equalized replay signal from opto preamplifier 30 is connected to a channel processor block 40 where the replay signal is employed to synchronize a phase locked loop which is utilized to demodulate the 8:16 modulation employed during recording. In addition the channel processor may include further processing of the reflected signal. During BCA data acquisition the reflected signal processor processes illumination reflected from the disk surface, for example as depicted in FIG. 1D, to form a signal having a first state indicative of the presence BCA data reflections and a second state indicative of an absence of BCA data reflections. The presence of BCA data in the reflected signal may be identified by processing the signal depicted in FIG. 1D for example by amplitude clipping between values L and H to produce a cleaned up reflection representative waveform CLREF. Waveform CLREF can be processed to determine the presence of BCA data stripes BCAD by for example, detecting the width or time duration of intervals $\tau 1$ and $\tau 2$ depicted in FIG. 1D. For example a counter may count during interval $\tau 1$ and be reset by waveform part BCAD during interval $\tau 2$, thus, for example, a zero counter output result may be chosen to be indicative of a presence of BCA data reflection. However if waveform part BCAD is absent the counter will not be reset and will eventually over or underflows generating a output indicative of an absence of a BCA data reflection.

In a second method, BCA data reflections may be detected by a capacitor charge discharge arrangement where, for example, waveform part TRKa causes a charge to be accumulated at a first rate in, for example a capacitor, with waveform part BCAD causing the charge to be dissipated at a rate greater than the first rate. The accumulated charge is measured, for example by a comparator, and if less than a predetermined amount the comparator indicates of a presence of a BCA data reflection signal. However, an absence of a BCA data reflection signal causes charge to accumulate and exceed a second comparator threshold causing the comparator output to indicate an absence of a BCA data reflection signal.

In a further method waveform CLREF may be differentiated and used to trigger a retriggerable monostable multivibrator. The occurrence of a pulse due to an edge from waveform part BCAD holds the multivibrator in a re-triggered state which is chosen to be indicative of a reflection from BCA data signal and an absence of a BCA data signal reflection causes retriggering to stop with the multivibrator assuming a stable state indicating an absence of a BCA data signal reflection.

An MPEG bitstream is encoded for error detection and correction by means of Reed Solomon product coding which is applied to form error correction code (ECC) blocks containing 16 sectors, where each sector contains 2048 bytes of payload data. Thus following 8:16 demodulation the replay audio and video data stream payloads are de-interleaved or unshuffled and error corrected by means of Reed Solomon product correction within block 40, and implemented in ECC buffer memories (not shown). As described previously, if the control data in the run in data area indicates the presence of BCA data, the Reed Solomon error correction circuitry employed for the audio and video data is controllably bypassed and the BCA data is supplied as bit stream 41 to a track buffer memory 60A for storage prior to error correction processing by a central processing unit, element 510 of block 500.

The error corrected MPEG signal bit stream 41 is coupled to a bit stream or mechanical/track buffer memory 60A. The track buffer comprises a DRAM memory type and is used to store an amount of replayed data such that any repositioning of transducer 15 will not result in any visible deficiency when decoded. Thus the final output image stream will appear to be continuous or seamless to the viewer. Bitstream buffer memory 60A is part of an exemplary 16 megabit DRAM memory. A further exemplary 16 megabit SDRAM memory block is partitioned to provide frame buffers 60C and 60D which provide storage for at least two decoded image frames, compressed video bit stream storage in buffer 60B prior to decoding, an audio bit stream buffer 60E and other storage in buffers 60F, G and H. The channel processor 40 also includes timing control circuitry which controls writing to bitstream buffer 60A. Data may be intermittently written to the bitstream buffer as a consequence of changes in replay track addresses, for example, resulting from user defined replay video content such as a "Directors cut", parental guidance selection, or even user selectable alternative shot angles. To facilitate more rapid access and recovery of the recorded signal, disk 14 may be rotated at an increased speed resulting in the transduced bitstream having a higher delivery bit rate.

The digital video disk player is controlled by a central processing unit or CPU, element 510 of block 500, which accepts the reproduced bitstream and error flags from channel IC 40, and provides control instructions to servo IC 50. In addition CPU 510 accepts user control commands from user interface 90, and MPEG decoder control functions from the MPEG decoder element 530 of block 500. A system buffer memory 80 is addressed by, and provides data to CPU 510. For example, buffer 80 may comprise both RAM and PROM memory locations. The RAM may be used to store various data extracted from bitstream 41 by CPU 510, for example such data may include descrambling or decryption information, bitstream and frame buffer memory management data, and navigation data. The PROM may, for example contain a plurality of transducer jump algorithms which facilitate both trick modes and BCA data acquisition patterns.

Microcontroller 510 is coupled the front end via 12C control bus signal 514 to control or request transducer repositioning to acquire the next sector required by a user selected play back sequence. The transducer positioning for BCA data acquisition can be controlled by a stored sequence, or sequences. However, upon activation these inventive acquisition sequences automatically search the BCA record until terminated as a consequence of satisfactory error correction of the data or as a result of exceeding a maximum number of transducer search steps.

Within MPEG decoder 530 the video bit stream is processed by a variable length decoder 531 which searches the bitstream to locate slice and macro-block start codes. Certain decoded pictures from each group of pictures are written to frame buffers 60C and 60D for subsequent use as predictors when deriving or constructing other pictures, for example P and B pictures, of a GOP. Frame buffers 60C and 60D have a storage capacity of at least two video frames. Separated audio packets are stored in audio bit buffer 60E which is read out and coupled for audio decoding in block 110. Following MPEG or AC3 audio decoding a digitized audio signal results which is coupled to an audio post processor 130 for digital to analog conversion and generation of various base band audio signal outputs. A digital video output signal is transformed into a raster scan format by display buffer 580 from decoded blocks read from reference frame buffer 60C/D. The display buffer is coupled to encoder 590 which provides digital to analog signal conversion and generates baseband video components and encoded video signals.

Figure 3:
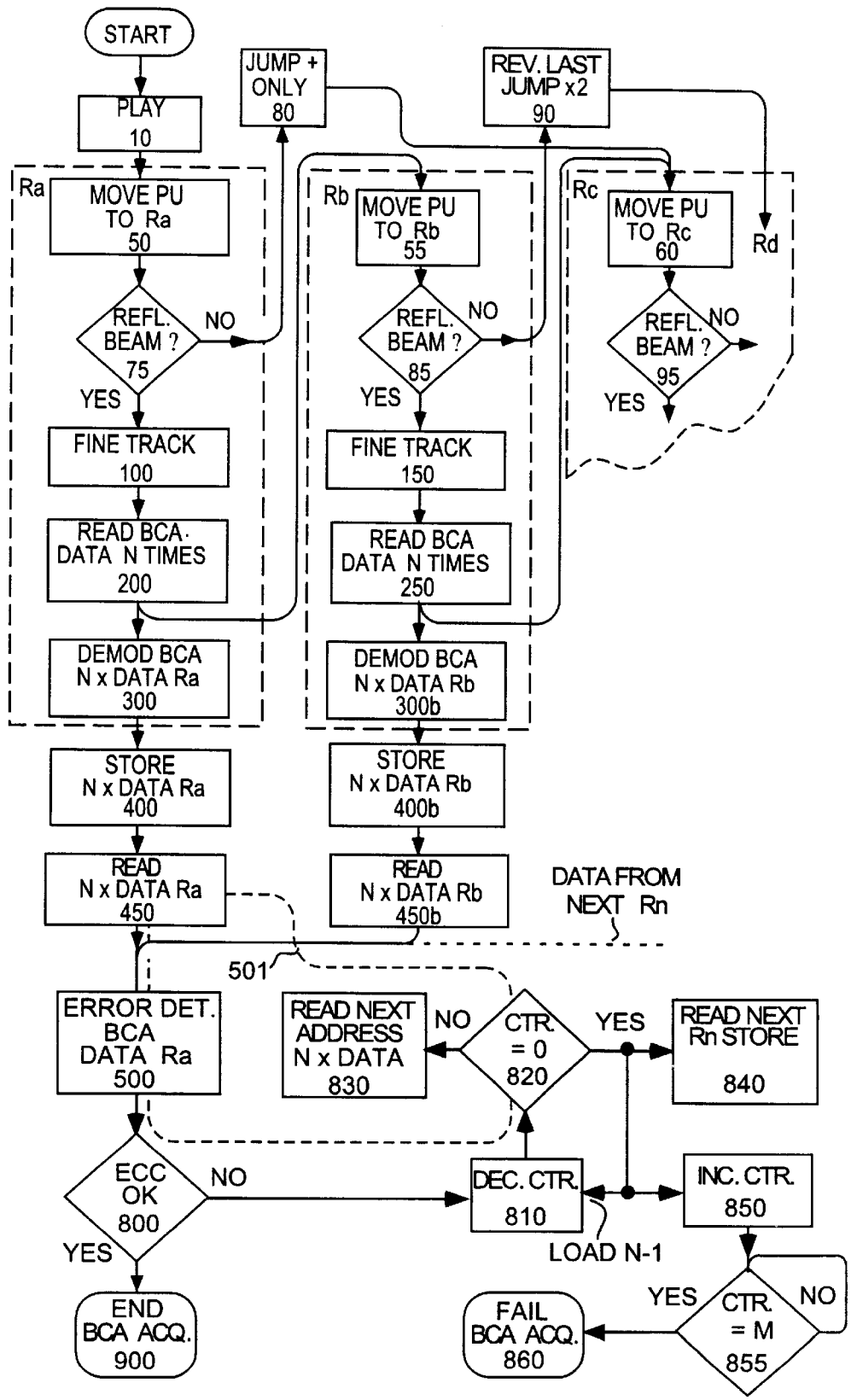
FIG. 3 is a flow chart illustrating inventive search sequences for data acquisition from BCA data records.

A flow chart is shown in FIG. 3 which illustrates inventive search methods which employ sequential transducer positioning to explore various parts of a BCA data record. A plurality data is acquired at each search position and these data are stored temporarily prior to error correction. These sequential acquisition sequences follow one of a plurality of search sequence until terminated by successful error correction of the BCA data or as a result of exceeding a maximum number of search positions.

The BCA data acquisition starts with the initiation of a PLAY mode at step 10. The transducer or pickup PU, is positioned to the disk run in area and the control data indicates the presence of data in the burst cutting area, thus transducer PU is moved, at step 50, to a first data search radius Ra which corresponds to the nominal center of the BCA record as specified in the standards document. Transducer PU can be radialy positioned by movement of sled 15, responsive to motor 11 or by means of motor 15T. However, which ever pickup positioning device is employed, it is controlled by stored instructions which can represent tachometer 11A revolutions due to motor 11 or current amplitude supplied to motor 15T. The pickup positioning search sequence can be stored in the back end and supplied via bus 514, or may be stored in the front end servo system, for example block 50, to be initiated via bus 514.

Following transducer positioning at the nominal center of the BCA record a test is performed at step 75, to determine if the pickup is receiving illumination reflected from the BCA data record. If step 75 tests NO the pickup may have been mis-positioned and is attempting read a non-BCA recorded area, or alternatively, the BCA record is located in a non-standard position. Thus a NO at step 75 results in the transducer being repositioned at step 80, in a positive radial direction towards the disk outer edge to attempt to locate the BCA record. The distance moved may, for example represent 500 tracks, which is approximately one third of the BCA record length. Thus having moved the transducer towards the disk outer edge a test is performed at step 95, to determine if the pickup is receiving reflected illumination from the disk. For the sake of illustration size and clarity, step 95, is depicted as part of the search sequence performed at radius Rc.

Returning to step 75, if the reflectance test is YES fine tracking is performed at step 100 and BCA data is read from the disk at step 200. The number of times N the data is read can be determined and controlled by the number of disk revolutions counted or elapsed from the time of positioning at exemplary radius Ra. Clearly a minimum of value of N=2 is required to insure at least one data set is transduced and N values of approximately 10 or more are probably wasteful of acquisition time since "good" recovered data will have achieve an error corrected status and BCA data searching terminated. Thus if "good", error correctable data is not acquired in an exemplary 10 revolutions, the search sequence automatically repositions the pickup to radius Rb at step 55. In a first inventive sequence the pickup is repeatedly repositioned about the nominal record center to search the radial record both outwardly, towards the outer edge and inwardly towards the spindle hole. Thus the pickup alternately jumps about the nominal center of the record. The search sequence repositions the pickup to a lesser radius than that of radius Ra, the nominal center value, by moving the pickup an exemplary 100 tracks closer to the spindle hole. This new reading position is tested at step 85 for reflected illumination from the disk. A NO at step 85 indicates that the initial position Ra was not centered in the BCA record and the pickup must be reposition to reacquire BCA data. Since step 55 moved the pickup an exemplary minus 100 tracks relative to radius Ra, the pickup is now moved or jumped in the reverse direction by twice the step 55 value. Thus, at step 90, the previous jump direction is reversed and the jump size doubled to position the pickup further into the BCA record and away from the record edge detected in step 85. Having detected the record edge, the first search embodiment is abandoned and a second search algorithm is adopted which employs a unidirectional sequence of jumps.

Returning to step 85, if the reflectance test is YES, fine tracking is performed at step 150 and BCA data is read from the disk N times at step 250. The number of times the data is controlled by the number of disk revolutions elapsed since radial position Rb was achieved. Having acquired N sets of BCA data the pickup is moved or jumped at step 60 to read radius Rc, which for example is plus 200 tracks relative position Rb. Thus the pickup is jumped over the nominal center position Ra to be located approximately 100 tracks beyond and closer to the disk outer edge. This it can be appreciated that in response to positioning steps 50, 55 and 60 the transducer or pickup automatically performs an ever widening search of the BCA data record. In addition this search sequence is automatically amended to become unidirectional if the data record edge is detected. Furthermore it may be appreciated that the sequence of operations performed within dotted boxes Ra, Rb and Rc are performed in a serial sequence, with the subsequent functions capable of implementation by a single processing chain as indicated by functional steps 300 and 300a, which are provided by a common element.

The sets of data read at steps 200 and 250 are coupled for demodulation in respective steps 300 and 300b with the demodulated data coupled for temporary storage at steps 400 and 400b. Data sets acquired from pickup position Ra are read from storage at step 450 and are subject to error correction at step 500, for example Reed Soloman controllably implemented by exemplary processor 510 of FIG. 2. The error corrector is tested at step 800 to determine if error correction was successfully accomplished with a YES terminating BCA data acquisition at step 900. If step 800 tested NO, the data was uncorrectable and a counter is decremented at step 810. The counter is set to a value of N-1 where N represents the number of data sets acquired at each read position. The value of counter 810 is tested at step 820 for equality with zero to determine if all data sets at the particular read position have been error corrected. If step 820 tests NO the next BCA data set is read memory in response to step 450. In this way a control loop 501 is established which sequentially presents each data set for error processing.

Step 820 tests YES, when all data sets at the particular read position, for example Ra have been error processed and found to be uncorrectable, causing step 840 to initiate reading of BCA data sets acquired at exemplary position Rb. In addition the YES at step 820 sets or loads the value N-1 at step 810 and increments a counter at step 850. As just described, control loop 501 sequences through the data stored from transducer position Rb and, for example, none of the data is error correctable which results in step 840 initiating reading of data from t exemplary position Rc. Once again the counter at step 850 is incremented and tested at step 855 for equality with a value M which represents the number of jumps performed by the transducer. Thus when the counter at step 850 is equal to M, step 855 tests YES indicating that all data sets from all transducer positions have failed error correction. Hence failure to acquire BCA data is indicated at step 860. Unlike current methods which employ a serial process of data acquisition and error correction with erroneous data initiating a request for additional BCA data from the disk.

FIG. 3 depicts various advantageous sequences for acquiring BCA data. In the first inventive sequence the data record is searched at a plurality disk radii to advantageously searched bi-directionally to maximize the speedy acquisition of error correctable data. In the second inventive sequence bidirectional searching is adaptively changed to a unidirectional search when the BCA record edge is detected. In the third inventive arrangement the BCA data record is systematically and adaptively searched to acquire BCA data independently of the error correction processing. Thus the separation of data gathering from error correction enables the speedier acquisition of valid data from disks with deficient or optically occluded burst cutting area data.

What is claimed is:

1. A method for acquiring data from a recording on a disk medium, comprising the steps of:
   a) successively reading bits defining a data set from different parts of said disk;
   b) error correcting said bits read from said different parts of said disk; and, c) terminating said reading step upon validating said bits in one of said different parts of said disk.

2. A method for acquiring data from a recording on a disk medium, comprising the steps of:
   a) initiating reading at a nominal center of said data recording;
   b) successively reading bits defining a data set from different parts of said disk;
   c) continuously error correcting said bits to validate at least a part of said data set read from said disk; and,
   d) terminating said reading upon successful validation of said data set by said error correcting step.

3. The method of claim 2, further comprising the step of:
   reading said bits defining said data set at successive disk locations which alternate about said nominal center of said data recording.

4. A method for acquiring data from a recording on a disk medium, comprising the steps of:
   a) reading a data set beginning from a first position on said data recording;
   b) reading said data set from a second position radially spaced in a first direction from said first position absent acquisition of an error free data set from said first position; and,
   c) reading said data set from a third position radially spaced in an opposite direction beyond said nominally centered position absent acquisition of an error free data set from said second position.

5. The method of claim 4, further comprising the step of:
   repeating steps b) and c) for radially spaced reading positions which diverge from said first position in opposite radial directions.

6. The method of claim 4, further comprising the step of:
   detecting a loss of reflected signal and changing said radially spaced reading positions to a sequence of reading positions which diverge unidirectional from said first position.

7. The method of claim 4, further comprising the step of:
   terminating said reading of said data set from said plurality of positions upon acquisition of an error free data set.

8. The method of claim 4, wherein said first position of said step a) corresponds to an approximate center of said data recording.

9. A method for acquiring data from a record on a disk medium, comprising the steps of:
   a) reading a data set from a first position on said data record
   b) reading said data set from a second position radially spaced from said first position absent acquisition of an error free data set from said first position; and,
   c) reading said data set from a third position radially spaced in the same direction beyond said second position absent acquisition of an error free data set from said second position.

10. The method of claim 9, further comprising the step of:
    reading said data set from successive positions radially spaced in the same direction beyond a preceding position absent acquisition of an error free data set from said preceding position.

11. The method of claim 9, further comprising the step of:
    terminating said reading of said data set from said plurality of positions upon acquisition of an error free data set.

12. The method of claim 9, further comprising the step of:
    locating said first reading position at a nominal edge of said data record.

13. The method of claim 9, further comprising the steps of:
    testing said first reading position for a presence of a reflected signal and absent said reflected signal relocating to said second reading position.

14. A method for acquiring BCA data from a record on a disk medium, comprising the steps of:
    a) reading a BCA data set beginning from a first position within said data record;
    b) absent valid BCA data from said step a), testing for a BCA reflection at a second position radially spaced from said first position;
    c) in the absence of said BCA reflection, testing for said BCA reflection at a third position radially spaced from said second position;
    d) in the presence of said BCA reflection, reading said BCA data set beginning from said second position
    e) in the absence of said BCA reflection, testing for said BCA reflection at a fourth position radially spaced from said third position;
    f) in the presence of said BCA reflection, reading said BCA data set beginning from said third position;
    g) moving between said first and said second positions and between said second and said third positions in the same direction or in opposite directions responsive to said presence or absence of said BCA reflection.

\* \* \* \* \*